United States Patent [19]
Callanan

[11] 3,724,795
[45] Apr. 3, 1973

[54] SELF-MOUNTING ELECTRICAL CONNECTION BOXES

[76] Inventor: Joseph R. Callanan, 382 Homeland Drive, Whitman, Mass.

[22] Filed: Nov. 12, 1970

[21] Appl. No.: 88,587

[52] U.S. Cl..............248/360, 248/205, 248/226 D
[51] Int. Cl.............................................F16m 13/00
[58] Field of Search..........248/205 R, 214, 221, 360, DIG. 6; 226/3.9, 3.92, 3.3, 3.4, 18

[56] References Cited
UNITED STATES PATENTS

| 2,328,421 | 8/1943 | Carlson et al | 248/DIG. 6 |
| 1,511,217 | 10/1924 | Floerchy | 248/214 X |
| 2,689,101 | 9/1954 | Dygert | 248/221 X |

Primary Examiner—William H. Schultz
Attorney—Curtis, Morris & Safford

[57] ABSTRACT

Electrical connection boxes having an alignment arm member extending from the box to align it on a building wall member, and a holding leg member extending from the arm to hold the box on the building wall member for permanent fastening.

7 Claims, 6 Drawing Figures

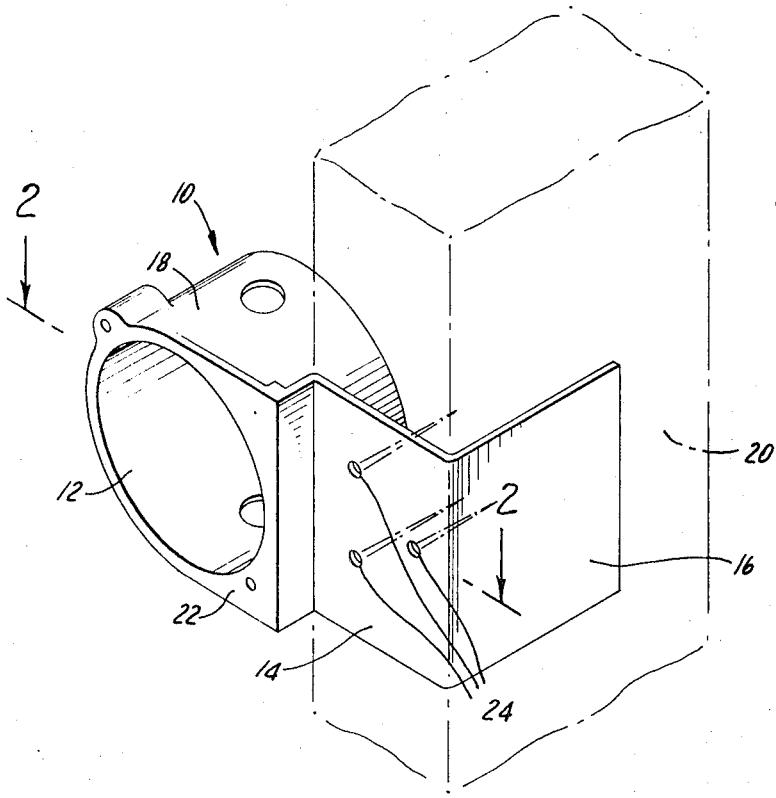
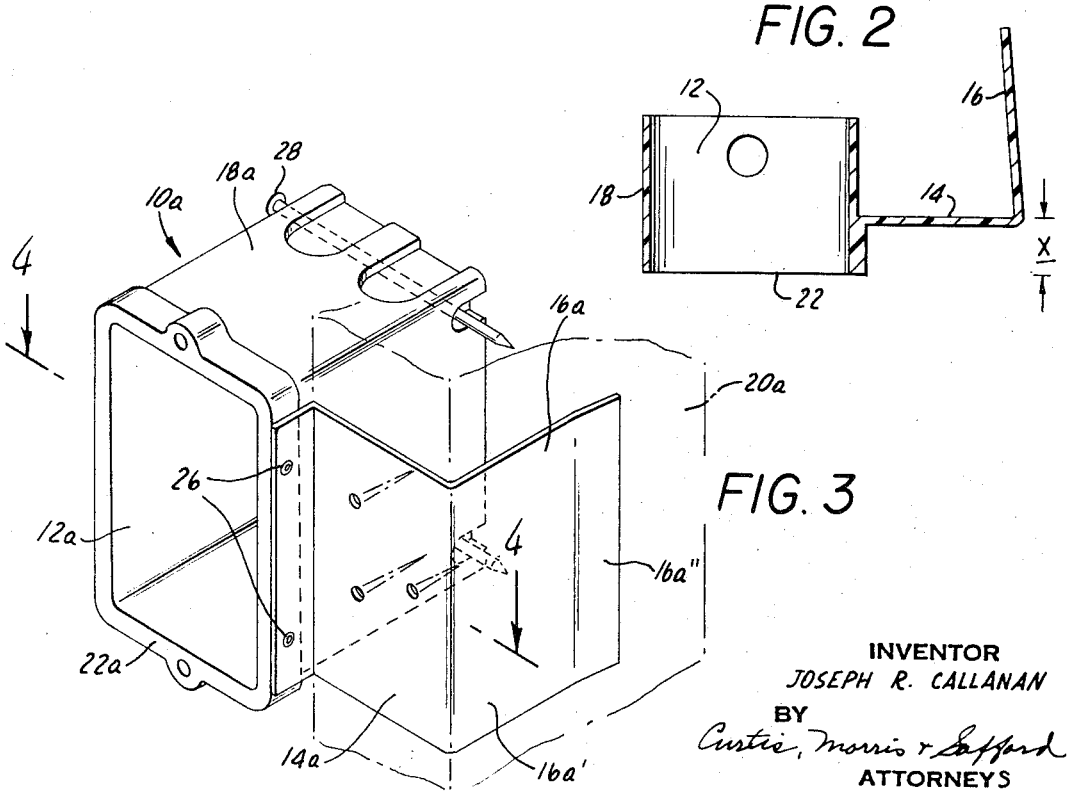

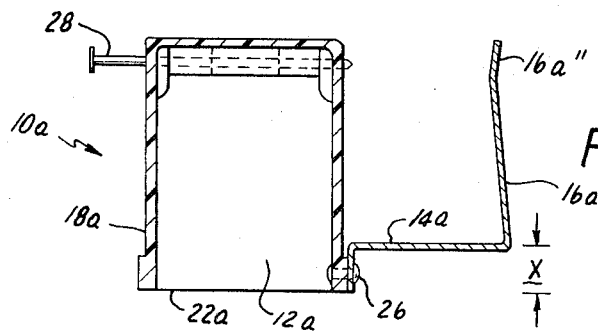
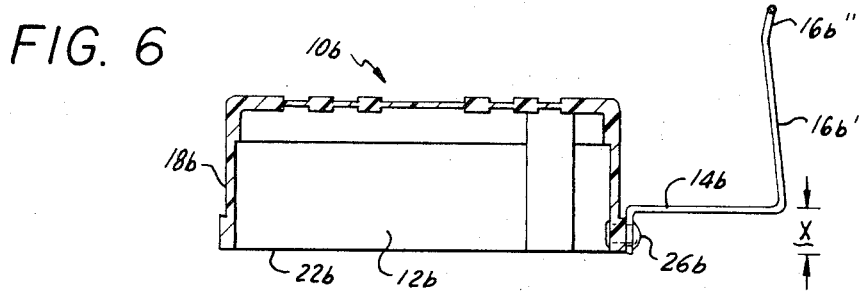
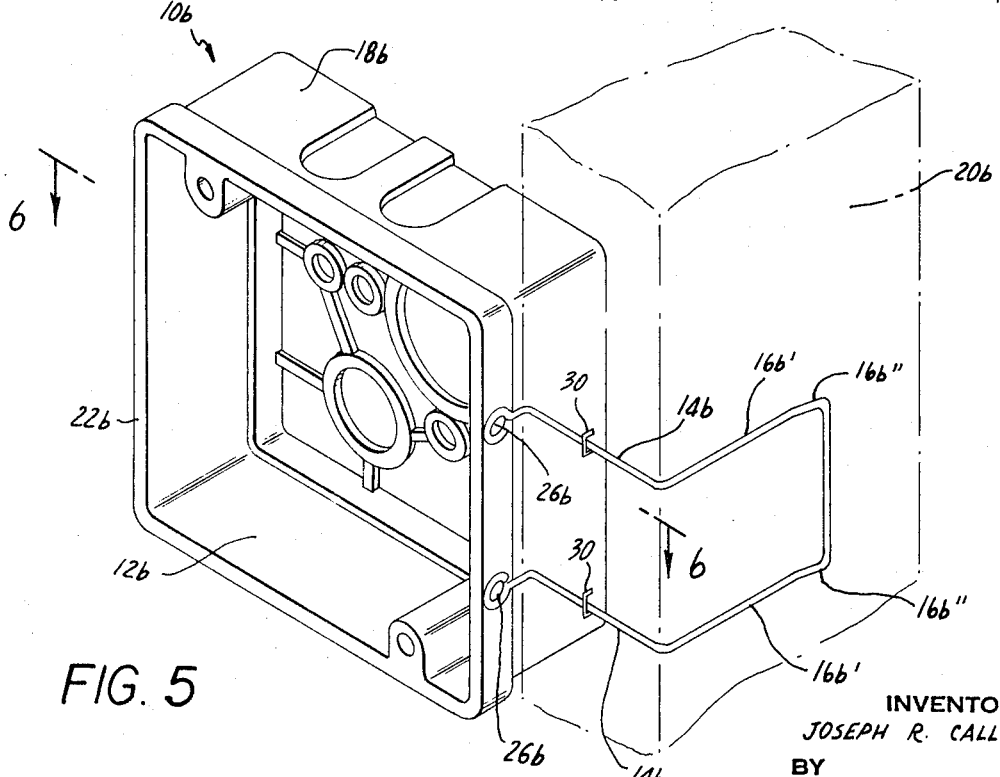

SELF-MOUNTING ELECTRICAL CONNECTION BOXES

This invention relates to electrical connection boxes, and more particularly to a sturdy, inexpensive unitary, self-aligning electrical connection box that quickly and easily can be mounted onto a stud or other member of a building under construction and accurately aligned and held on the member until permanently fastened thereto.

Electrical connection boxes ordinarily are mounted in new buildings, for example in houses on wall studs over which a lath and plaster or a dry-wall construction is secured to form the interior walls. The open face of the box, into which later is placed a receptacle or switch or other electrical device, must extend outwardly from the stud an amount about equal to the wall thickness so that the exposed portion of the box will be flush with the wall. Also, the box must be aligned vertically so its top and bottom project an equal distance from the front face of the stud.

Hand mounting of electrical boxes is difficult and time consuming because at least one hand must be used to hold the box as it is secured, e.g., by nails, to the stud. The box often slips, or inadvertently is moved by the worker's hand, and is misaligned. A house might have as many as twenty or more electrical boxes for lights, switches, outlets and telephone extensions, so that the time involved properly to hand mount the boxes, and to re-mount misaligned ones, is considerable.

Numerous devices have been created to align or to hold and align electrical connection boxes as they are secured to studs. Many such devices have been patented, for example, in U.S. Pat. Nos. 2,802,634, 2,990,172 and 3,154,304. In general, however, the previous devices have serious shortcomings, being of relatively complex construction and having a multiplicity of parts some of which are movable, and thus are both expansive to make and very subject to wear and breakage.

It is an object of this invention to provide improved electrical connection boxes. Another object of this invention is to provide an electrical connection box that has mounting elements permanently attached to the box, which make it simple to place the box on a stud or building member, and which accurately and positively align and hold the box against the stud for permanent fastening. A further object of this invention is to provide an electrical connection box of the type described that has a relatively simple design and unitary construction, without a multiplicity of parts, particularly moving parts. These and other objects of this invention will be in part discussed in, and in part apparent from, the following more detailed disclosure.

The present invention can be understood more thoroughly by reference to the accompanying drawings, in which:

FIG. 1 is a perspective and shows an embodiment of an electrical connection box according to this invention mounted on a building member;

FIG. 2 is a section and shows the box of FIG. 1 with its mounting elements in relation to the box;

FIG. 3 is a perspective and shows another type of electrical connection box of the invention mounted and aligned on a stud;

FIG. 4 is a section and shows the box of FIG. 3 with its mounting elements in relation to the box;

FIG. 5 is a perspective and shows another type of electrical connection box of the invention mounted and aligned on a stud; and FIG. 6 is a section and shows the box of FIG. 5 with its mounting elements in relation to the box.

Broadly, the electrical connection boxes of this invention have a receiving section to accommodate various electrical devices, for example switches and plug outlets, and mounting elements extending from the receiving section to align the box on a building member and to hold the box thereon until permanently fastened.

FIGS. 1 and 2 illustrate an embodiment of the invention wherein the electrical connection box 10 has a receiving section or receptacle 12 of a type often used for telephone connecting devices, and mounting elements 14,16 extending from a side wall 18 of the receptacle. The element 14 is an alignment arm that serves to position the box properly against a building member 20, such as a stud. The plane of the alignment arm is substantially parallel to the open face 22 of the receiving section 12 so that the face of the box can be mounted in the plane of a wall (not shown) later secured to the building member 20. The alignment arm 14 is set back from the open face 22 of the receiving section 12 a distance X that is a predetermined amount substantially equal to the thickness of the wall to be secured to the building member. Thus the alignment arm 14, when placed against the building member 20, correctly projects the receiving section 12 outwardly from the member so that the face 22 will be flush with the prospective wall.

Extending from the alignment arm 14 in a direction away from the open face 22 of the receiving section 12 is a leg member 16 mounting element. The leg member 16 is adapted to pass along and bear firmly against the building member 20, and thereby to hold securely the properly aligned and spaced box 10 on the member. FIG. 2 shows that the leg member 16 is at slightly less than a right angle to the alignment arm 14 and tends to close in toward the receptacle 12. The mounting members 14, 16 are made of a resiliently flexible material, for example, a spring steel or a synthetic plastic having similar properties, so the leg member 16 can be spread apart from the receiving section 12 to receive the building member 20 and, in that operative condition shown in FIG. 1, exerts a force against the member 20 to hold the box 10 firmly thereon.

Mounted as shown in FIG. 1, the box can be permanently fastened to the building member, for example by nails (not shown) driven through holes 24 provided in the alignment arm 14.

The box 10a illustrated in FIGS. 3 and 4 has a receiving section or receptacle 12a typically used for switches and plug outlets. The mounting elements 14a,16a of the box are not integral with the receiving section 12a, in contrast to the box shown in FIGS. 1 and 2, but are separately formed and permanently fastened to the side wall 18a of the receiving section by suitable means, for example by rivets 26. In addition, the leg member 16a, has a first section 16a' equivalent to the leg member 16 described in connection with FIGS. 1 and 2, and at the end a second section 16a". The sections 16a' and 16a"

are at a small angle to one another so that the second section 16a'' is directed slightly away from the receiving section 12a. That construction facilitates passing the leg member 16a onto and along a building member 20a, e.g., by preventing digging of the lead edge of the leg member into the wood of a stud. Aligned and held in place, the box 10a can be permanently fastened to the stud 20a by a nail 28.

The box 10b illustrated in FIGS. 5 and 6 has a receiving section or receptacle 12b typical of a type often used for fuses, and amounting elements 14b, 16b formed of strips of stiffly resilient material such as spring steel, fastened by rivets 26b to the side wall 18b of the receptacle. The leg member 16b has two sections, 16b' and 16b'' that correspond to the two sections of the leg member 16a described in connection with FIGS. 3 and 4. Staples 30 around the alignment arms 14b permanently fasten the box to the stud.

It is of course to be understood that numerous changes can be made in the design and construction of the boxes of this invention without departing from the scope of the invention as disclosed herein before and as defined in the following claims.

I claim:

1. An electrical connection box adapted to receive electrical connection means comprising side wall members defining a receiving section having an open face and mounting means to mount said electrical connection box to an upstanding building member, said mounting means including: an alignment arm extending from a side wall of said connection box in a plane substantially parallel to said open face thereof and being set back from said open face a predetermined distance substantially equal to the distance said open face is to project outwardly from said building member, said alignment arm having at least one fastener receiving means; and a leg member of resiliently flexible material spaced from said side wall and extending from said alignment arm in a direction opposite said open face of said receiving section and being disposed to angle inwardly toward said side wall of said receiving section whereby when said electrical connection box is mounted on said building member said building member is disposed between said side wall and said leg member and said leg member is displaced outwardly to an orientation substantially at a right angle to said alignment arm whereby said leg member exerts a force inwardly toward said side wall to securely grip said building member between said leg member and said side wall and retain said connection box on said building member.

2. A box according to claim 1 wherein said mounting elements are integral with said receiving section.

3. A box according to claim 1 wherein said mounting elements are a separate unit permanently secured to said receiving section.

4. A box according to claim 1 wherein said mounting elements are a thin elongated member shaped to form said alignment arm and said leg member.

5. A box according to claim 1 wherein said leg member has a first section extending from said alignment arm toward said receiving section and a second section spaced from said alignment arm extending away from said receiving section.

6. A box according to claim 1 wherein said side wall members define a substantially circular receiving section.

7. The combination of an electrical connection box adapted to receive electrical connection means and a building member having said electrical connection box mounted thereon and fastened thereto, which comprises: a building member; an electrical connection box adapted to receive electrical connection means comprising side wall members defining a receiving section having an open face and mounting means to mount said electrical connection box to an upstanding building member, said mounting means including an alignment arm extending from a side wall of said connection box in a plane substantially parallel to said open face thereof and being set back from said open face a predetermined distance substantially equal to the distance said open face is to proJect outwardly from said building member, a leg member of resiliently flexible material spaced from said side wall and extending from said alignment arm in a direction opposite said open face of said receiving section and being disposed to angle inwardly toward said side wall of said receiving section whereby when said electrical connection box is mounted on said building member said building member is disposed between said side wall and said leg member and said leg member is displaced outwardly to an orientation substantially at a right angle to said alignment arm whereby said leg member exerts a force inwardly toward said side wall to securely grip said building member between said leg member and said side wall and retain said connection box on said building member; said electrical connection box being mounted on said building member whereby said building member is disposed between said side wall and said leg member and against said alignment arm; and fastening means securing said electrical connection box to said building member.

* * * * *